United States Patent
Tessarolo et al.

(10) Patent No.: US 12,373,216 B2
(45) Date of Patent: Jul. 29, 2025

(54) CONDITIONAL BRANCH INSTRUCTIONS

(71) Applicant: TEXAS INSTRUMENTS INCORPORATED, Dallas, TX (US)

(72) Inventors: Alexander Tessarolo, Lindfield (AU); Venkatesh Natarajan, Bangalore (IN); Alan Davis, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 12 days.

(21) Appl. No.: 18/427,411

(22) Filed: Jan. 30, 2024

(65) Prior Publication Data

US 2025/0060965 A1    Feb. 20, 2025

Related U.S. Application Data

(60) Provisional application No. 63/532,941, filed on Aug. 16, 2023.

(51) Int. Cl.
*G06F 9/38* (2018.01)
*G06F 9/30* (2018.01)
*G06F 9/32* (2018.01)

(52) U.S. Cl.
CPC ........ *G06F 9/3804* (2013.01); *G06F 9/30058* (2013.01); *G06F 9/30061* (2013.01); *G06F 9/323* (2023.08)

(58) Field of Classification Search
CPC ............... G06F 9/3804; G06F 9/30058; G06F 9/30061; G06F 9/323; G06F 9/325
See application file for complete search history.

(56) References Cited

U.S. PATENT DOCUMENTS

| | | | | |
|---|---|---|---|---|
| 2007/0234019 | A1* | 10/2007 | Terashima | G06F 9/30094 712/234 |
| 2008/0313443 | A1* | 12/2008 | Terashima | G06F 9/30021 712/234 |
| 2009/0177874 | A1* | 7/2009 | Terashima | G06F 9/30094 712/E9.016 |
| 2014/0189296 | A1* | 7/2014 | Ould-Ahmed-Vall | G06F 9/30036 712/22 |
| 2019/0079770 | A1* | 3/2019 | Grocutt | G06F 9/323 |

(Continued)

*Primary Examiner* — Shawn Doman
(74) *Attorney, Agent, or Firm* — Brian D. Graham; Frank D. Cimino

(57) ABSTRACT

Various embodiments of the present disclosure relate to conditional branch instructions to support software pipelining techniques. In an example embodiment, a system including instruction fetch circuitry, decoder circuitry, and conditional branch circuitry is provided. The instruction fetch circuitry is configured to fetch a conditional branch instruction from memory and provide the instruction to the decoder circuitry. The instruction includes an iteration count and multiple branch destinations. The branch destinations include two or more branch destinations corresponding to conditions against which the conditional branch circuitry evaluates the iteration count. The decoder circuitry is configured to cause the conditional branch circuitry to select a branch destination, of the two or more branch destinations, based on a comparison of the iteration count to each of the conditions and cause the instruction fetch circuitry to fetch an indication of an instruction from a memory location stored at the selected branch destination.

20 Claims, 5 Drawing Sheets

(56) References Cited

U.S. PATENT DOCUMENTS

| | | | |
|---|---|---|---|
| 2020/0341765 A1* | 10/2020 | Ogawa | G06F 8/4434 |
| 2024/0086295 A1* | 3/2024 | Ogawa | G06F 9/30058 |
| 2024/0202002 A1* | 6/2024 | Ido | G06F 9/3842 |

* cited by examiner

CONDITIONAL BRANCH INSTRUCTIONS

CROSS-REFERENCE TO RELATED APPLICATIONS

This application claims the benefit of and priority to U.S. Patent Application No. 63/532,941, filed Aug. 16, 2023, entitled "INSTRUCTION SET TECHNIQUE TO OPTIMIZE REMAINDER OF LOOP ITERATIONS," which is hereby incorporated herein by reference.

TECHNICAL FIELD

This disclosure relates generally to instruction set architectures, and in particular embodiments, to conditional branching.

BACKGROUND

In computing, software pipelining is a technique that may be used to take advantage of multiple processing resources by scheduling the execution of application code across the multiple processing resources in parallel and in a loop. Code within a first loop may be re-arranged by unrolling, which may reduce the number of loop iterations by techniques such as replacing the first loop with a larger second loop that includes multiple copies of the instructions of the first loop such that each iteration of the second loop performs multiple iterations of the first loop. In this way, the application code associated with the first loop may be executed a number of times in the course of a single iteration of the second loop. However, there may be limits on the number of smaller loops that may be grouped into a larger loop. In other words, following the execution of the application code within the larger loop, a processing system may still need to perform leftover iterations of the application code from the original, smaller loop as the loop count may not be an integral multiple of the number of times the application code is executed in the larger loop. For example, if the originally specified loop is to be executed 43 times and the loop body of the new, larger loop executes 4 iterations of the original loop, then 3 iterations of the original loop have to be executed outside the loop body of the larger loop.

Existing solutions may use predication and conditional branching techniques to perform the leftover iterations of the application code. For example, in one solution, a compiler may produce several individual instructions that can be used to check for each possible outcome following the execution of a larger loop (e.g., zero iterations remaining, one iteration remaining, etc.). Each instruction may be executed in a separate cycle. Accordingly, this may increase the number of processing cycles required when executing a loop despite using software pipelining to increase efficiency of a processing system. Alternatively, pipelining may not be used, and a compiler may sequence application code to be executed by the various processing resources sequentially. While this may avoid overhead added by using current branching techniques, this does not offer other processing benefits provided by using software pipelining.

SUMMARY

Disclosed herein are improvements to instruction set architectures, and more specifically, to conditional branching instructions for software pipelining. Software pipelining may refer to performing various operations among different processing resources in parallel and in such a way that a loop body, including a set of instructions for performing the various operations of the processing resources, can be executed multiple times in a single iteration of the loop body. Any operations remaining after executing the loop body may be called remainder operations and may be performed outside of a loop. In an example embodiment, a conditional branch instruction that can direct a processing system, or components thereof, to identify one of multiple locations holding instructions related to remainder operations may be provided. In such an example embodiment, a system includes instruction fetch circuitry, decoder circuitry coupled to the instruction fetch circuitry, and conditional branch circuitry coupled to the decoder circuitry. The instruction fetch circuitry is configured to fetch a conditional branch instruction from a memory and provide the conditional branch instruction to the decoder circuitry. The conditional branch instruction specifies an iteration count and multiple branch destinations. The branch destinations include two or more branch destinations corresponding to conditions against which the conditional branch circuitry evaluates the iteration count. The decoder circuitry is configured to cause the conditional branch circuitry to select a branch destination, of the two or more branch destinations, based on a comparison of the iteration count to each of the conditions and cause the instruction fetch circuitry to fetch an indication of an instruction from a memory location stored at the selected branch destination.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Figure 1:
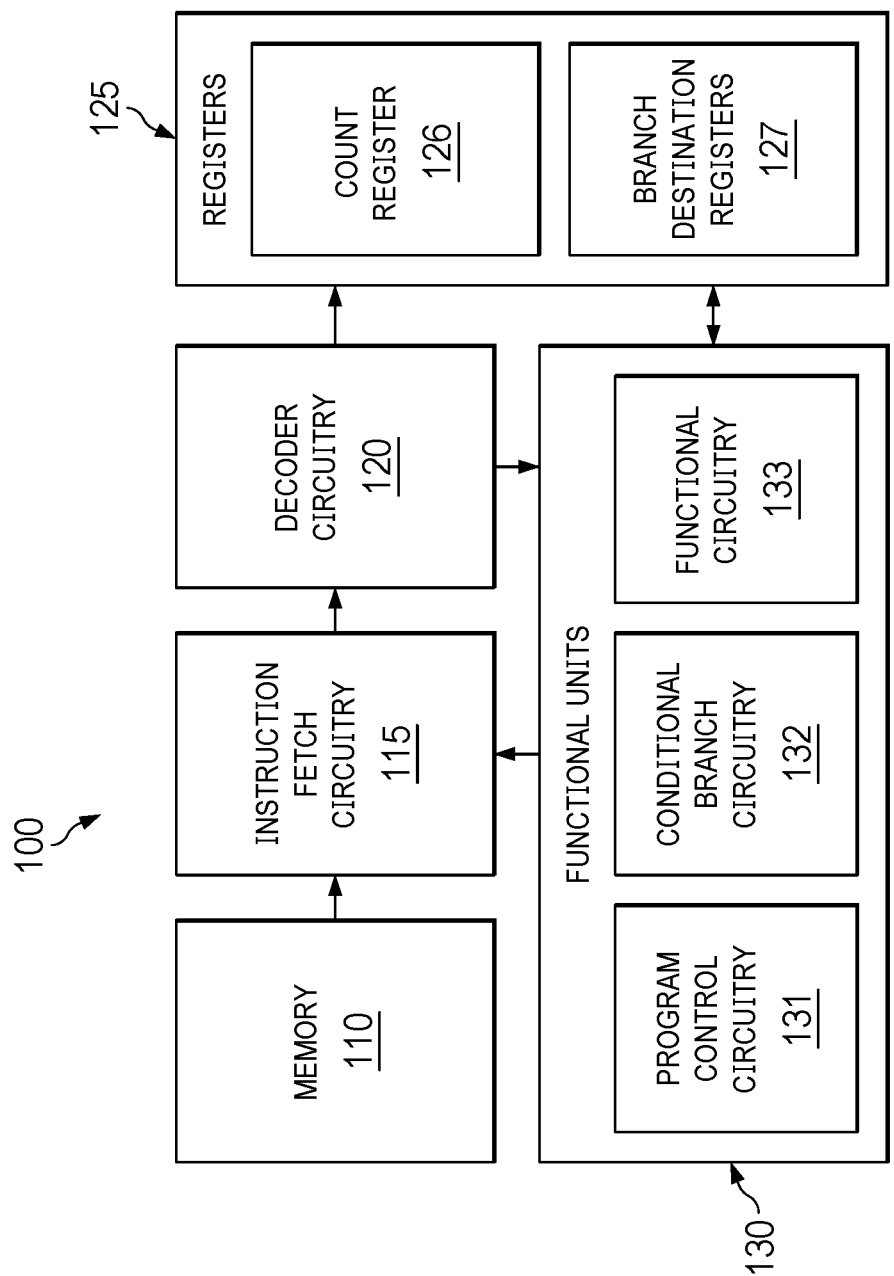
FIG. 1 illustrates an example operating environment configurable to execute a conditional branch instruction in an implementation.

Discussed herein are enhanced components, techniques, systems, and methods related to software pipelining and conditional branching when implementing software pipelining techniques. Software pipelining may refer to performing various operations among different processing resources in parallel and in such a way that a loop body, including a set of instructions for performing the various operations of the processing resources, can be executed multiple times in a single iteration of the loop body. Software pipelining and parallelism techniques may be used in Very Long Word Instruction (VLIW) architectures having many parallel functional units. In such architectures, a compiler may receive code in a high-level language that specifies a first loop and create assembly language code arranged in a loop body of a second loop that includes multiple iterations of the first loop. The compiler can structure the assembly language code such that the second loop is executed a given number of loop iterations. Any operations associated with the first loop remaining after executing the loop body of the second loop may be called remainder operations and may be performed outside of a loop. Problematically, such remainder operations may introduce processing capacity overhead and additional processing cycles that may diminish benefits of software pipelining.

Some existing solutions may use conditional branching techniques, such as a sequence of several conditional branches, to perform the leftover iterations of the application code. For example, in one solution, a compiler may produce several individual instructions that can be used to check for each possible outcome following the execution of a loop (e.g., zero iterations remaining, one iteration remaining, etc.). However, each instruction may be executed in a separate cycle. For example, in pipelined processors, each conditional branch execution may incur cycle penalties. Thus, this may increase both the number of processing cycles required when executing a loop and the number of lines of instructions, which may reduce efficiency gained using software pipelining techniques.

Instead, as described herein, a compiler may use a conditional branch instruction, indicating a location with a count value and multiple branch destinations that can be navigated to based on the count value, which can be executed in a single processing cycle. When the conditional branch instruction is executed, the conditional branch instruction can direct a processor or a processing system, or components thereof, to identify one of multiple branch destinations holding instructions, or indications or locations thereof, related to respective remainder operations. In various examples, the conditional branch instruction may be executed by conditional branch circuitry of a processing system, which may include one or more circuitry components of a functional unit, such as a program control unit. The assembly language loop may include instructions performed by other functional units. Following the execution of the assembly language loop the number of loop iterations, the conditional branch instruction may be executed, which can direct the processing system where to perform the remainder operations beyond the assembly language loop.

In an example embodiment, a system including instruction fetch circuitry, decoder circuitry coupled to the instruction fetch circuitry, and conditional branch circuitry coupled to the decoder circuitry is provided. The instruction fetch circuitry is configured to fetch a conditional branch instruction from a memory and provide the conditional branch instruction to the decoder circuitry. The conditional branch instruction specifies an iteration count and two or more branch destinations. The two or more branch destinations correspond to conditions against which the conditional branch circuitry evaluates the iteration count. The decoder circuitry is configured to cause the conditional branch circuitry to select a branch destination, of the two or more branch destinations, based on a comparison of the iteration count to each of the conditions and cause the instruction fetch circuitry to fetch an indication of an instruction from a memory location stored at the selected branch destination.

In another example embodiment, one or more computer-readable storage media including program instructions stored thereon is provided. The program instructions include a conditional branch instruction that specifies an iteration count and two or more branch destinations. The two or more branch destinations correspond to conditions against which a processor evaluates the iteration count. When read and executed by a processing system, the program instructions direct the processor to select a branch destination, of the two or more branch destinations, based on a comparison of the iteration count to each of the conditions and fetch an indication of an instruction from a memory location stored at the selected branch destination.

In yet another embodiment, a method of executing a conditional branch instruction is provided. The method includes receiving, via instruction fetch circuitry, a conditional branch instruction from memory and performing a comparison of an iteration count specified by a conditional branch instruction to each of multiple conditions corresponding to two or more branch destinations specified by the conditional branch instruction. Based on the result of the comparison, the method includes selecting a branch destination of the two or more other branch destinations. The method also includes causing the instruction fetch circuitry to fetch an indication of an instruction from a memory location stored at the selected branch destination.

Advantageously, such a conditional branch instruction may have the technical effect of reducing the amount of code or lines of program instructions within application code, which may be performed within a single processing cycle. Thus, not only does this reduce the number of processing cycles used during application code execution, such as within software pipelining use-cases, but also this may reduce the overhead and complexity of the application code and branching thereof.

FIG. 1 illustrates an example operating environment configurable to execute program instructions, such as a conditional branch instruction, in an implementation. FIG. 1 illustrates operating environment 100, which demonstrates components of a processing system including memory 110, instruction fetch circuitry 115, decoder circuitry 120, registers 125, and functional units 130. Registers 125 include count register 126 and branch destination register(s) 127. Functional units 130 include program control circuitry 131, conditional branch circuitry 132, and functional circuitry 133. In some embodiments, the elements shown in operating environment 100 may be included inside a processing system, such as a microcontroller unit (MCU) or a central processing unit (CPU). In some embodiments, some of the elements shown in operating environment 100 may be included outside of a processing system.

In various examples, the components of operating environment 100 may be configured to perform functions and enable functionality of peripherals by executing program instructions of application code using functional units 130. The program instructions may be sequenced and repeated using loops defined by a compiler via software pipelining techniques, such that one or more functional units 130 may perform sets of instructions a number of times within loops, and such that the loops may be performed a number of times themselves. The processing system may further be configured to execute sets of instructions outside of the loops, which may be referred to as remainder operations.

The following examples demonstrate sample iteration counts and capabilities of the processing system to provide context about remainder operations and a role of conditional branching techniques to resolve remainder operations. In the following examples, the processing system may be capable of performing a given number of iterations (e.g., four iterations) of instructions of a loop body of a first, smaller loop in a single loop iteration of a second, larger loop. By way of a first example, for pre-compiled application code indicating 16 iterations of a loop body of a first loop, the processing system may execute a second loop that contains 4 copies of the instructions of the first loop 4 times (4 loop iterations of the second loop with each loop body iterating the instructions of the first loop 4 times within a loop iteration of the second loop) and exit the second loop with zero remainder iterations of the loop body of the first loop. This loop behavior may be advantageous when each copy of the instructions of the first loop may be executed in parallel within a single iteration of the second loop. This loop behavior may also be advantageous when it has the potential to reduce the number of end-of-loop checks since the number of iterations of the second loop is lower.

However, for application code that calls for a number of iterations of the first loop that is not a multiple of the unroll factor (e.g., four), the processing system may be required to execute a loop body of the first loop a number of times outside of the second loop to avoid performing too many iterations, performing null operations, or using unnecessary processing capacity if, for example, another iteration of the second loop were performed. By way of a second example, for an application code indicating 42 iterations of a loop body of a first loop, the processing system may execute the second loop 10 times. However, upon completion of 10 loop iterations, the application code may specify two additional loop iterations of the first loop outside of the looping sequence. In other words, another loop iteration of the second loop may cause the instructions to be performed four times, which is two more times more than the pre-compiled code specified. Thus, two remainder operations may result with an iteration count of 42. By way of a third example, for an application code indicating 51 iterations of a loop body of a first loop, the processing system may execute the second loop 12 times. However, upon completion of 12 loop iterations, the application code may specify three additional loop iterations of the first loop outside of the looping sequence.

Referring back to operating environment 100 of FIG. 1, the components of the processing system may be configured to execute special conditional branch instructions to resolve the remainder iterations of the first loop outside of looping sequences, which may increase both code and cycle efficiency.

The processing system may include instruction fetch circuitry 115, which may be representative of one or more components of the processing system capable of performing instruction fetch operations during the execution of the program instructions. For example, instruction fetch circuitry 115 may be configured to fetch instructions stored in memory 110 and provide the instructions to decoder circuitry 120. Memory 110 may be representative of one or more volatile or non-volatile computer-readable storage media including instructions, data, and the like (e.g., random access memory, flash memory). Instruction fetch circuitry 115 may be configured to fetch such instructions from memory 110 in an order specified by the compiler when compiling the instructions into application code.

Decoder circuitry 120 may be representative of one or more components of the processing system capable of decoding instructions fetched by instruction fetch circuitry 115. Decoder circuitry 120 may identify functional units 130 and registers 125 from decoded instructions and cause functional units 130 to perform various functions specified by the instructions using data and code located in memory 110 and/or in registers 125 as indicated by the instructions. In other words, decoder circuitry 120 may identify and enable one or more of registers 125 for use by one or more of functional units 130 during the execution of the application code. While only one decoder is illustrated in FIG. 1 (decoder circuitry 120), several decoders or decoder circuits may be included in a processing system to decode instructions provided to respective components of the processing system. For example, each of functional units 130 may include decoder circuitry.

Registers 125 may be representative of memory locations that can store data and/or instructions for use during the execution of application code. In various examples, registers 125 may include count register 126 and branch destination registers 127, each of which may include different information relative to one another. For example, count register 126 may store a numerical value of an iteration count that can be incremented or decremented during the execution of loops by the processing system. Branch destination registers 127 may store memory or address locations, such as absolute addresses or address offsets, or indications thereof, that correspond to or hold such instructions corresponding to remainder operations that may be executed a number of times outside of a loop. For example, branch destination registers 127 may include a first destination corresponding to one or more instructions to exit a loop when zero remainder operations remain following execution of program instructions in a loop, branch destination registers 127 may include a second destination corresponding to one or more instructions to perform instructions within a loop one time when one remainder operation remains following execution of the program instructions in the loop, and so on. Any number of branch destination registers 127 may be contemplated and may be based on the capabilities of a processing system to perform instructions among various functional units in parallel.

Functional units 130 may be coupled to instruction fetch circuitry 115, decoder circuitry 120, and registers 125, and may be representative of one or more circuits capable of performing one or more operations as directed by the program instructions. For example, functional units 130 may be able to perform arithmetic operations, comparison operations, digital logic operations, and more. Examples of functional units 130 may include program control circuitry 131, conditional branch circuitry 132, and functional circuitry 133.

Functional circuitry 133 may be representative of one or more circuits configured to execute program instructions. In various examples, functional circuitry 133 may refer to various elements of the processing system that executes instructions within loops and performs iterations of the loops as defined by the compiler. Functional circuitry 133 may be directed to perform such iterations by decoder circuitry 120. While performing the iterations, functional circuitry 133 may store data in registers 125 and/or read instructions and data from registers 125. When decoder circuitry 120 causes functional circuitry 133 to perform instructions of a loop body (i.e., a set of code sequenced in a loop and iterated a number of times), functional circuitry 133 can repeatedly perform a sequence of operations a number of loop body iterations and decrement the iteration count at count register 126 each time functional circuitry 133 completes a loop body iteration until functional circuitry 133 has finished executing a specified number of iterations of the entire loop (loop iterations).

Conditional branch circuitry 132 may be representative of one or more circuits configured to execute program instructions, or more particularly, conditional branch instructions of the application code. In an example, conditional branch circuitry 132 may include compare circuitry, selector circuitry, and output circuitry, among other types of circuits that can perform various functions. The conditional branch instructions may specify various parameters, such as a field or operation type (e.g., QDEC), an indication of count register 126, indications of branch destination registers 127, and the like, which may be used by conditional branch circuitry 132 to determine how many remainder operations remain following execution of application code loops. Based on the number of remainder operations, conditional branch circuitry 132 may provide an indication of a location where subsequent instructions for execution by functional circuitry 133 may be stored in registers 125 to program control circuitry 131 (i.e., one of branch destination registers 127).

Program control circuitry 131 may be representative of one or more circuits configured to perform application code management functionality of the processing system. In various examples, program control circuitry 131 can direct instruction fetch circuitry 115 to fetch certain instructions in a specific order as other functional units 130, such as conditional branch circuitry 132 and functional circuitry 133, execute instructions during run-time operations of the system.

In operation, the components of operating environment 100 may be configured to perform conditional branching processes to either continue a loop or perform remainder operations leftover after executing program instructions in loops. To begin, instruction fetch circuitry 115 may be configured to fetch a conditional branch instruction from memory 110. The conditional branch instruction may identify multiple destinations within registers 125. These may include count register 126 and branch destination registers 127. In some examples, count register 126 may hold an iteration count corresponding to a number of loop body iterations remaining following the execution of the first loop the number of loop iterations, which may be reduced by the number of copies of instructions of the first loop inside the second loop each time the second loop iterates. For example, following the previous above example, for a beginning iteration count of 42, and for a second loop that includes 4 copies of instructions, the iteration count can be decremented by four each time the second loop iterates until a remainder of two is left. In some examples, branch destination registers 127 may include two or more branch destinations corresponding to conditions against which the conditional branch circuitry 132 can evaluate the iteration count of count register 126. Instruction fetch circuitry 115 can provide the conditional branch instruction to decoder circuitry 120.

Decoder circuitry 120 may be configured to receive the conditional branch instruction from instruction fetch circuitry 115 and cause conditional branch circuitry 132 to perform various functions. For example, decoder circuitry 120 may cause conditional branch circuitry 132 to perform a comparison of the iteration count stored at count register 126 to determine whether to continue a loop, and if the loop is to be terminated, to compare the iteration count to each of multiple conditions corresponding to each of branch destination registers 127 included in the conditional branch instruction. Decoder circuitry 120 may also cause conditional branch circuitry 132 to select one of branch destination registers 127 based on the result of the comparison. By way of example, if the iteration count has a value of two, conditional branch circuitry 132 can compare the value to each condition value associated with each of branch destination registers 127. A first branch destination may include a condition value of zero, a second branch destination may include a condition value of one, a third branch destination may include a condition value of two, and a fourth branch destination may include a condition value of three in an example where the loop iteration includes a value of four (i.e., the loop body may be iterated four times). Accordingly, conditional branch circuitry 132 may select the third branch destination based on the value of the iteration count.

Decoder circuitry 120 may then cause conditional branch circuitry 132 to provide the selected branch destination to program control circuitry 131. Program control circuitry 131 may identify the selected branch destination and cause instruction fetch circuitry 115 to fetch an indication of an instruction from a memory location in memory 110 stored at the selected branch destination. In various examples, each of branch destination registers 127 may include an address or location of memory 110 where program instructions are stored pertaining to remainder operations.

More specifically, following the previous example, the memory 110 may store a second loop that includes 4 copies of the instructions associated with the first loop. If the value in the count register 126 is greater than or equal to the number of copies (e.g., 4), the conditional branch instruction may cause the conditional branch circuitry 132 to cause the second loop to be executed and the value in the count register 126 to be decremented by the number of copies (e.g., 4). After execution of the second loop, execution returns to the conditional branch instruction. In contrast, if the value in the count register 126 is less than the number of copies, the same conditional branch instruction may cause the conditional branch circuitry 132 to branch to one of the branch destinations specified by the conditional branch instruction. The first branch destination may correspond to a remainder of zero and may specify a memory location beyond the end of these copies of the first loop instructions in the second loop and may correspond to one or more instructions to exit the loop and move to the next instruction in the application code. The second branch destination may correspond to a remainder of 1 and may specify a memory location at the start of the final copy of the first loop instructions within the second loop, thus causing the program instructions of the first loop to be performed one time. The third branch destination may correspond to a remainder of 2 and may specify a memory location at the start of the second-to-last copy of the first loop instructions within the second loop, thus causing the program instructions of the first loop to be performed two times. The fourth branch destination may correspond to a remainder of 3 and may specify a memory location at the start of the third-to-last copy of the first loop instructions within the second loop, thus causing program instructions of the first loop to be performed three times.

Figure 2:
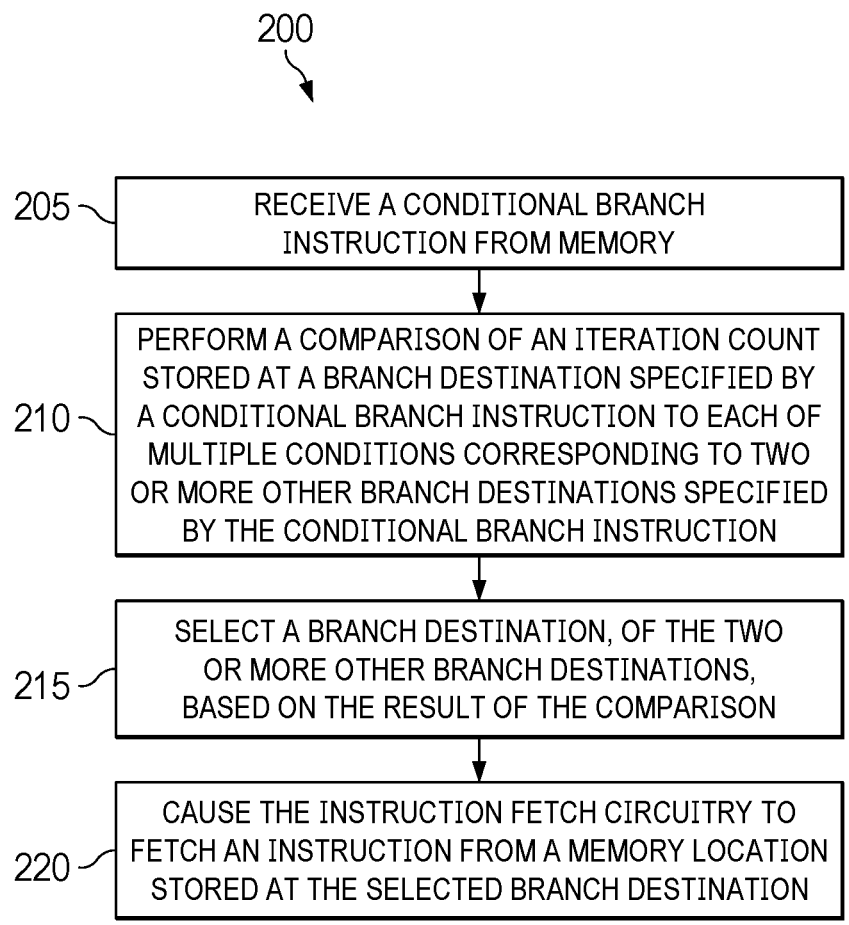
FIG. 2 illustrates a series of steps for executing a conditional branch instruction that includes multiple branch register destinations in an implementation.

FIG. 2 illustrates a series of steps for executing a conditional branch instruction that includes multiple branch register destinations in an implementation. FIG. 2 includes process 200, which references elements of FIG. 1. In various examples, process 200 may be implemented by one or more components of a processing system, such as instruction fetch circuitry 115, decoder circuitry 120, and functional units 130 of FIG. 1. Process 200 may be implemented by software, hardware, firmware, or any combination or variation thereof.

In operation 205, instruction fetch circuitry 115 is configured to fetch a conditional branch instruction from memory 110. Instruction fetch circuitry 115 may be representative of one or more components of a processing system capable of performing instruction fetch operations during the execution of the program instructions, such as fetching program instructions, including the conditional branch instruction, in an order specified by the compiler when compiling the instructions into application code.

In various examples, the conditional branch instruction may identify multiple locations within registers 125 (e.g., memory locations that can store data and/or instructions, or indications thereof, for use during the execution of application code). These locations specified by the conditional branch instruction may include count register 126 and branch destination registers 127, which includes two or more branch destinations corresponding to conditions against which the conditional branch circuitry 132 can evaluate the iteration count of count register 126. Instruction fetch circuitry 115 can provide the conditional branch instruction to decoder circuitry 120.

Decoder circuitry 120, which may be representative of one or more components of the processing system capable of decoding instructions fetched by instruction fetch circuitry 115, may be configured to receive the conditional branch instruction from instruction fetch circuitry 115 and cause conditional branch circuitry 132 to perform various functions. Conditional branch circuitry 132 may be representative of a functional unit of functional units 130 configured to perform conditional branching processes as directed by decoder circuitry 120. Functional units 130, including conditional branch circuitry 132, may be coupled to instruction fetch circuitry 115, decoder circuitry 120, and registers 125, and may be representative of one or more circuits capable of performing one or more operations as directed by the program instructions. In an example, conditional branch circuitry 132 may include compare circuitry, selector circuitry, and output circuitry, among other types of circuits that can perform various functions.

In operation 210, decoder circuitry 120 may cause conditional branch circuitry 132 to perform a comparison (e.g., via compare circuitry) of the iteration count stored at count register 126 to determine whether to continue a loop, and if the loop is to be terminated, to compare the iteration count to each of multiple conditions corresponding to each of branch destination registers 127 included in the conditional branch instruction. By way of example, if the iteration count has a value of two, conditional branch circuitry 132 can compare the value to each condition value associated with each of branch destination registers 127. A first branch destination may be associated with a condition value of zero, a second branch destination may be associated with a condition value of one, a third branch destination may be associated with a condition value of two, and a fourth branch destination may be associated with a condition value of three in an example where the loop iteration includes a value of four (i.e., the loop body may be iterated four times). In this example, conditional branch circuitry 132 may evaluate that iteration count is equal to the condition value of the third branch destination by performing the comparison.

In operation 215, decoder circuitry 120 may cause conditional branch circuitry 132 to select a branch destination (i.e., one of branch destination registers 127) based on the result of the comparison in operation 210. Following the previous example, conditional branch circuitry 132 may select the third branch destination based on the value of the iteration count.

In operation 220, decoder circuitry 120 may then cause conditional branch circuitry 132 to provide the selected branch destination to program control circuitry 131. Program control circuitry 131 may identify the selected branch destination and cause instruction fetch circuitry 115 to fetch an indication of an instruction from a memory location in memory 110 stored at the selected branch destination. In various examples, each of branch destination registers 127 may include a memory location of memory 110 where program instructions are stored pertaining to remainder operations. More specifically, following the previous example, the first branch destination may correspond to a remainder of zero and may specify a memory location beyond the end of copies of first loop instructions in a second loop and correspond to one or more instructions to exit the loop and move to the next instruction in the application code. The second branch destination may correspond to a remainder of 1 and may specify a memory location at the start of a final copy of the first loop instructions, thus causing the program instructions of the first loop to be performed one time. The third branch destination may correspond to a remainder of 2 and may specify a memory location at the start of a second-to-last copy of the first loop instructions, thus causing the program instructions of the first loop to be performed two times. The fourth branch destination may correspond to a remainder of 3 and may specify a memory location at the start of a third-to-last copy of the first loop instructions, thus causing the program instructions of the first loop to be performed three times. Thus, in this example, the program control circuitry 131 may cause instruction fetch circuitry 115 to fetch the instructions from the memory location associated with the third branch destination, such that when instruction fetch circuitry 115 fetches these instructions and provides the instructions to decoder circuitry 120, decoder circuitry 120 may cause functional circuitry 133 to execute the instructions to perform operations of the first loop two times outside of the loop operation performed before the conditional branch instruction was fetched.

Figure 3:
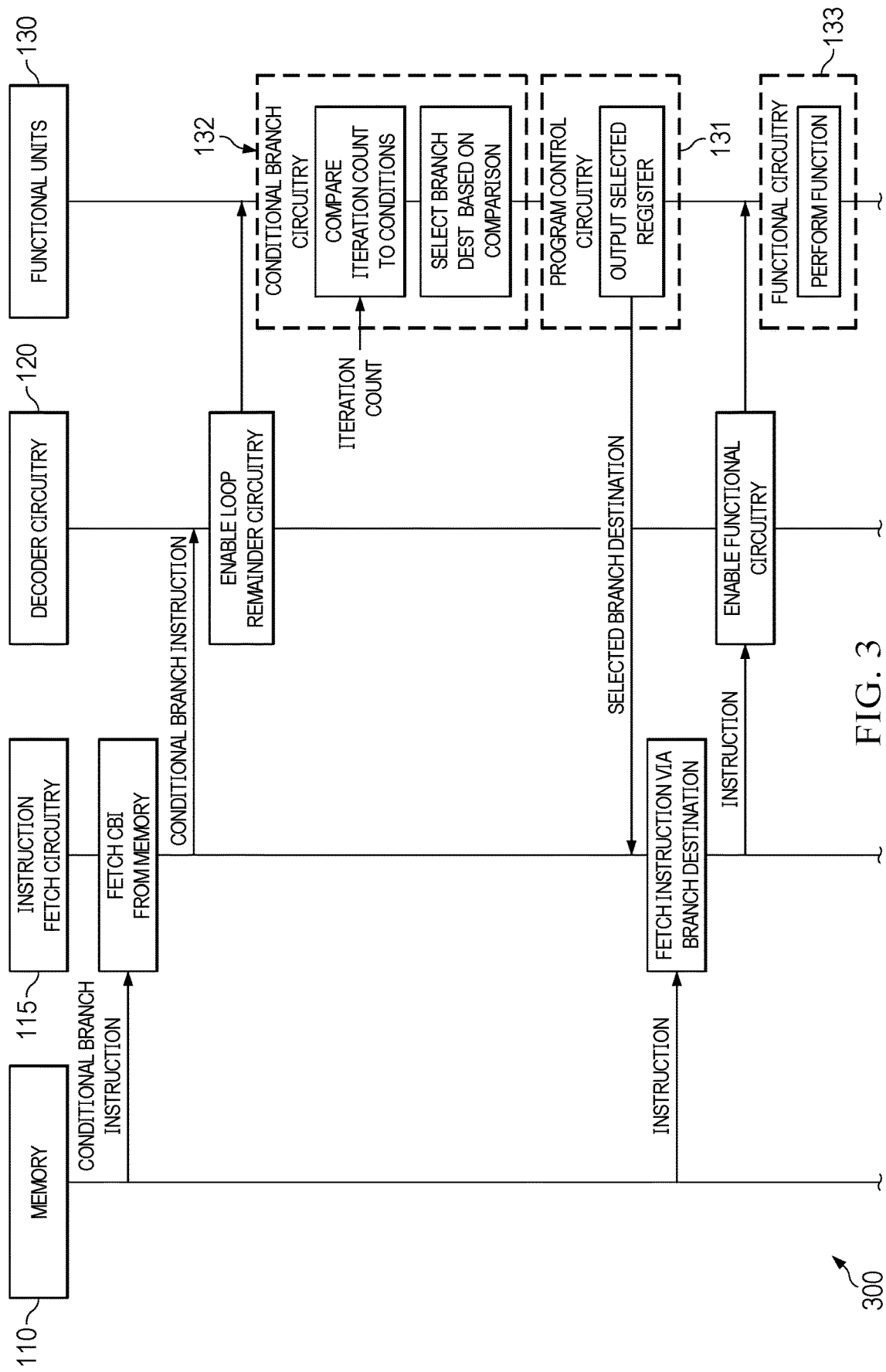
FIG. 3 illustrates a sequence of steps for executing instructions in a processing system in an implementation.

FIG. 3 illustrates a sequence of steps for executing instructions in a processing system in an implementation. FIG. 3 includes sequence 300, which references elements of FIG. 1. In various examples, sequence 300 may be implemented by one or more components of a processing system, such as instruction fetch circuitry 115, decoder circuitry 120, and functional units 130 of FIG. 1. Sequence 300 may be implemented by software, hardware, firmware, or any combination or variation thereof.

In operation, a processing system including memory 110, instruction fetch circuitry 115, decoder circuitry 120, and functional units 130 may be configured to execute program instructions of application code. The processing system may execute some of the program instructions in loops a number of loop iterations. The set of instructions within the loop may be referred to as the loop body, which can also be executed a number of loop body iterations. For example, the processing system may perform a given number of iterations (e.g., four iterations) of instructions of a loop body of a first, smaller loop in a single loop iteration of a second, larger loop. Thus, for a pre-compiled application code indicating 48 iterations of a loop body, the processing system may execute a second loop that contains 4 copies of the instructions of the first loop 12 times (12 loop iterations of the second loop with each loop body iterating the instructions of the first loop 4 times within a loop iteration of the second loop) and exit the second loop with zero remainder iterations of the loop body of the first loop. However, for application code that calls for a number of iterations of the first loop that is not an integral multiple of the unroll factor (e.g., four), such as 51 iterations, the processing system may be required to execute a loop body of the first loop a number of times outside of the second loop (referred to as remainder operations) (e.g., 3 remainder operations) to avoid performing too many iterations, performing null operations, or using unnecessary processing capacity if, for example, another iteration of the second loop were performed. It is with respect to the remainder operations that sequence 300 is discussed.

To begin, instruction fetch circuitry 115 may be configured to fetch a conditional branch instruction from memory 110 following the completion of the processing system executing instructions in loops a number of loop iterations. Instruction fetch circuitry 115 may be representative of one or more components of a processing system capable of performing instruction fetch operations during the execution of the program instructions, such as fetching program instructions, including the conditional branch instruction, in an order specified by the compiler when compiling the instructions into application code.

In various examples, the conditional branch instruction may identify multiple locations within registers 125 (e.g., memory locations that can store data and/or instructions for use during the execution of application code). These locations may include count register 126 and branch destination registers 127, which includes two or more branch destinations corresponding to conditions against which the conditional branch circuitry 132 can evaluate the iteration count of count register 126. Instruction fetch circuitry 115 can provide the conditional branch instruction to decoder circuitry 120.

Decoder circuitry 120, which may be representative of one or more components of the processing system capable of decoding instructions fetched by instruction fetch circuitry 115, may be configured to receive the conditional branch instruction from instruction fetch circuitry 115 and cause conditional branch circuitry 132 to perform various functions. Conditional branch circuitry 132 may be representative of a functional unit of functional units 130 configured to perform conditional branching processes as directed by decoder circuitry 120. Functional units 130, including conditional branch circuitry 132, may be coupled to instruction fetch circuitry 115, decoder circuitry 120, and registers 125, and may be representative of one or more circuits capable of performing one or more operations as directed by the program instructions. In an example, conditional branch circuitry 132 may include compare circuitry, selector circuitry, and output circuitry, among other types of circuits that can perform various functions.

Decoder circuitry 120 may cause conditional branch circuitry 132 to perform a comparison (e.g., via compare circuitry) of the iteration count stored at count register 126 to each of multiple conditions corresponding to each of branch destination registers 127 included in the conditional branch instruction. Following an example where 51 iterations of a loop body of the first loop are required, and where functional units 130 of a processing system can perform four iterations of a loop body in parallel, the iteration count may have a value of three following execution of twelve loop iterations. Thus, if the iteration count has a value of three, conditional branch circuitry 132 can compare the value to each condition value associated with each of branch destination registers 127. A first branch destination may be associated with a condition value of zero, a second branch destination may be associated with a condition value of one, a third branch destination may be associated with a condition value of two, and a fourth branch destination may be associated with a condition value of three. In this example, conditional branch circuitry 132 may evaluate that iteration count is equal to the condition value associated with the fourth branch destination (three) by performing the comparison.

Based on the result of the comparison, decoder circuitry 120 can enable conditional branch circuitry 132 to select a branch destination (e.g., the fourth branch destination of branch destination registers 127). It follows that conditional branch circuitry 132 may select the fourth branch destination based on the value of the iteration count. Decoder circuitry 120 may then cause conditional branch circuitry 132 to provide the selected branch destination to program control circuitry 131. Program control circuitry 131 may identify the selected branch destination and cause instruction fetch circuitry 115 to fetch an indication of an instruction from a memory location in memory 110 stored at the selected branch destination. In various examples, each of branch destination registers 127 may include a memory location of memory 110 where program instructions, or indications thereof, are stored pertaining to remainder operations. More specifically, following the previous example, the first branch destination may correspond to a remainder of zero and may specify a memory location beyond the end of copies of the first loop instructions in the second loop and correspond to one or more instructions to exit the loop and move to the next instruction in the application code. The second branch destination may correspond to a remainder of 1 and may specify a memory location at the start of the final copy of the first loop instructions, thus causing the instructions of the first loop to be performed one time. The third branch destination may correspond to a remainder of 2 and may specify a memory location at the start of the second-to-last copy of the first loop instructions, thus causing the instructions to be performed two times. The fourth branch destination may correspond to a remainder of 3 and may specify a memory location at the start of the third-to-last copy of the first loop instructions, thus causing the instructions to be performed three times. Thus, in this example, the program control circuitry 131 may cause instruction fetch circuitry 115 to fetch the instructions from the memory location of memory 110 indicated at the fourth branch destination.

Instruction fetch circuitry 115 can fetch the instruction from memory 110 and provide the instruction to decoder circuitry 120. Decoder circuitry 120 can enable functional circuitry 133 to execute the instruction. Following the previous example, the instruction may include program instructions, such that when executed, functional circuitry 133 can perform operations of the first loop three times outside of the second loop.

Other examples may be contemplated where different numbers of loop body iterations may need to be performed, and thus, different numbers of remainder operations may be leftover for evaluation by executing conditional branch instructions. Thus, combinations or variations of sequence 300 may be performed by components of a processing system.

Figure 4:
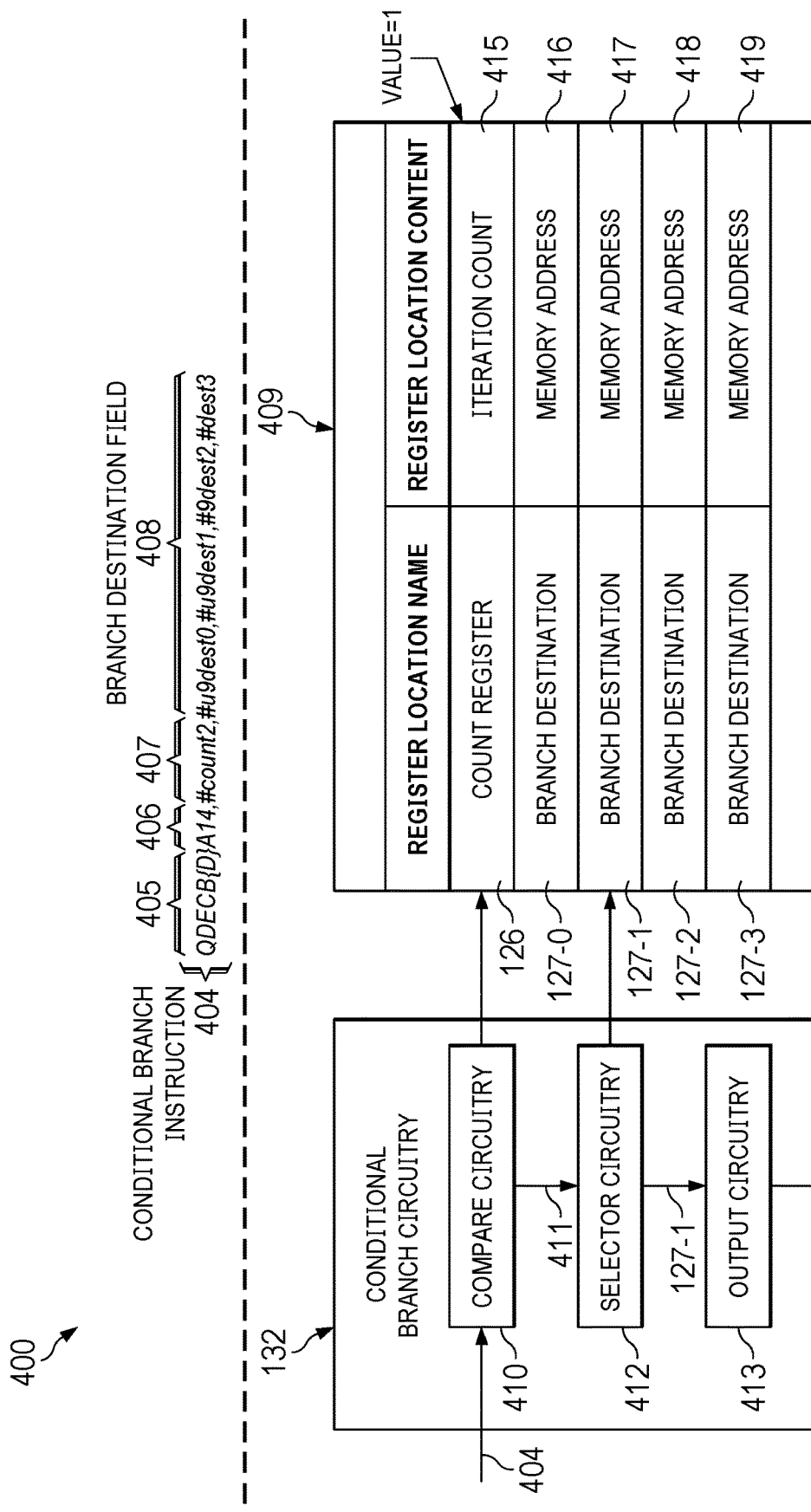
FIG. 4 illustrates an example operating environment configurable to execute a conditional branch instruction in an implementation.

FIG. 4 illustrates an example operating environment configurable to execute a conditional branch instruction in an implementation. FIG. 4 illustrates operating environment 400, which includes conditional branch circuitry 132 and conditional branch instruction 404, which includes operation field 405, count field 406, condition field 407, and branch destination field 408.

In various examples, conditional branch circuitry 132 may be representative of one or more circuits configured to execute program instructions, or more particularly, conditional branch instructions of the application code, such as conditional branch instruction 404. In an example, conditional branch circuitry 132 includes compare circuitry 410, selector circuitry 412, and output circuitry 413.

The conditional branch instruction 404 may include various parameters, values, fields, and indications corresponding to operations and locations where to access such operations or related data. For example, conditional branch instruction 404 may specify operation field 405, count field 406, condition field 407, and branch destination field 408. Conditional branch instruction 404, when read and executed by conditional branch circuitry 132, may cause conditional branch circuitry 132 to perform various functions, such as determining a number of remainder operations following a number of execution iterations of a loop body and determining from where to direct instruction fetch circuitry (e.g., instruction fetch circuitry 115 of FIG. 1) to fetch subsequent instructions.

Operation field 405 may indicate a type of operation supported by an instruction set architecture of a processing system that includes conditional branch circuitry 132, among other components. In this example, operation field 405 may be representative of a QDEC operation, which may be representative of a discontinuity instruction to select between performing a loop and to performing a remainder of loop iterations.

Count field 406 may indicate a name or location of a register associated with operation field 405 that stores a count value (e.g., count register 126). In this example, count field 406 may indicate an A14 register (e.g., registers 125 of FIG. 1) (e.g., a register set of a C29x CPU used for address generation and loop counts, among other uses) of a processing system.

Condition field 407 may indicate a value or a register holding a value to be compared to the value associated with the count field 406. For example, count field 406 may indicate a location of count register 126 and condition field 407 may specify an unroll factor associated with the loop (e.g., a number of copies of a smaller loop contained in the loop itself). Count register 126 may store the iteration count 415. For example, a processing system may perform a given number of iterations (e.g., four iterations) of instructions of a loop body of a first, smaller loop in a single loop iteration of a second, larger loop. The application code may specify a number of loop body iterations and a number of loop iterations, and as the first loops are executed, iteration count 415 may be incremented or decremented to keep track of remaining iterations.

Branch destination field 408 may specify a number of branch destinations either directly or by specifying registers containing branch destinations. For example, branch destination field 408 may specify a first branch destination named "#u9dest0", which may correspond to branch destination 127-0, a second branch destination named "#u9dest1", which may correspond to branch destination 127-1, a third branch destination named "#u9dest2", which may correspond to branch destination 127-2, and a fourth branch destination named "#u9dest3", which may correspond to branch destination 127-3. Branch destination 127-0 may include memory address 416, which may include a set of program instructions that, when read and executed by functional units (e.g., functional circuitry 133 of functional units 130), direct a processing system to exit a loop and move to another line of code (i.e., there are no remainder operations). Branch destination 127-1 may include memory address 417, which may include a set of program instructions that, when read and executed by functional units, direct a processing system to perform one iteration of instructions of a loop (i.e., there is one remainder operation). Branch destination 127-2 may include memory address 418, which may include a set of program instructions that, when read and executed by functional units, direct a processing system to perform two iterations of instructions of a loop (i.e., there are two remainder operation). Branch destination 127-3 may include memory address 419, which may include a set of program instructions that, when read and executed by functional units, direct a processing system to perform three iterations of instructions of a loop (i.e., there are three remainder operation).

In operation, instruction fetch circuitry (e.g., instruction fetch circuitry 115) may be configured to fetch conditional branch instruction 404 from a memory (e.g., memory 110) after a number of loop iterations of a first loop. The instruction fetch circuitry may provide conditional branch instruction 404 to decoder circuitry (e.g., decoder circuitry 120), which may cause conditional branch circuitry 132 to perform various functions based on elements of conditional branch instruction 404. In various examples, compare circuitry 410 may identify elements of conditional branch instruction 404, such as operation field 405, count field 406, and condition field 407. Based on operation field 405, compare circuitry 410 may be directed to identify count register 126 of registers 409, identify the value of iteration count 415 at count register 126, and identify a value of condition field 407 (i.e., the number of loop iterations) to determine result 411 and a corresponding one of branch destinations 127. In some examples, branch destination 127-0 may correspond to a condition having a value of zero, branch destination 127-1 may correspond to a condition having a value of one, branch destination 127-2 may correspond to a condition having a value of two, and branch destination 127-3 may correspond to a condition having a value of three.

Compare circuitry 410 may be first directed to compare iteration count 415 to the value of condition field 407. If the value of iteration count 415 is equal to or greater than the value of condition field 407, compare circuitry 410 may output result 411 that indicates that iteration count 415 corresponds to branch destination 127-0, and thus, causing the loop to continue and iteration count 415 to be decremented by the value of condition field 407. In an example with an unroll factor of 4, if iteration count 415 is 10, compare circuitry 410 can determine to continue the loop and decrement iteration count 415 to 6. Then, compare circuitry 410 may be directed to compare iteration count 415 to the condition of branch destination 127-3 if the value of iteration count 415 is less than the value of condition field 407. If compare circuitry 410 determines that the value of iteration count 415 is equal to the condition value of branch destination 127-3, compare circuitry 410 can output result 411 that indicates that iteration count 415 corresponds to branch destination 127-3, and thus, remainder iterations to be performed and iteration count 415 to be decremented by the value of the condition. If compare circuitry 410 determines that the value of iteration count 415 is not equal to the condition value of branch destination 127-3, compare circuitry 410 may be directed to compare iteration count 415 to the condition of branch destination 127-2, and so on as illustrated in Table 1 below.

In this example, iteration count 415 may include a loop counter value of one. Compare circuitry 410 can compare the value of iteration count 415 to conditions associated with each of branch destination field 408. Accordingly, compare circuitry 410 may determine result 411 that indicates that iteration count 415 corresponds to branch destination 127-1 in this example.

Compare circuitry 410 can provide result 411 to selector circuitry 412. Selector circuitry 412 may select branch destination 127-1 based on result 411 and may provide an indication including branch destination 127-1 to output circuitry 413. Output circuitry 413 can output the indication including branch destination 127-1 to another functional unit, such as a program flow management unit (e.g., program control circuitry 131). In some examples, the program flow management unit may cause instruction fetch circuitry to fetch memory address 417 from branch destination 127-1, which may be left-shifted by one bit. In some examples, branch registration locations 408 may include indications of locations in a different memory (e.g., memory 110) from where the instruction fetch memory can fetch the instructions to perform remainder operations. Regardless, the instructions associated with the remainder operations can be performed in response to reading and executing conditional branch instruction 404 in a single cycle, which may advantageously reduce the number of processing cycles required to check for remainder operations and fetch instructions associated with the remainder operations.

By way of example, the following table may illustrate example syntax and semantics of conditional branch instruction 404 that instruction fetch circuitry may provide to the decode circuitry and that may cause conditional branch circuitry 132 to perform functionality as described above, where "QDECB{D}" and "DDECB{D}" correspond to operation field 405, "A14" corresponds to count field 406, "#count2" corresponds to condition field 407, and "PC+ #u9dest3<<1", "PC+ #u9dest2<<1", and "PC+ #u9dest1<<1" correspond to branch destination field 408 and associated branch destinations 127 with left-shifted final destination addresses:

number of remainder operations, and one of the five branch destinations may correspond to a location storing instructions for exiting the loop. Regardless of the number of branch destinations, conditional branch circuitry 132 may be configured to determine a number of remainder operations and select a branch destination corresponding to the number of remainder operations within a single instruction and single cycle.

Figure 5:
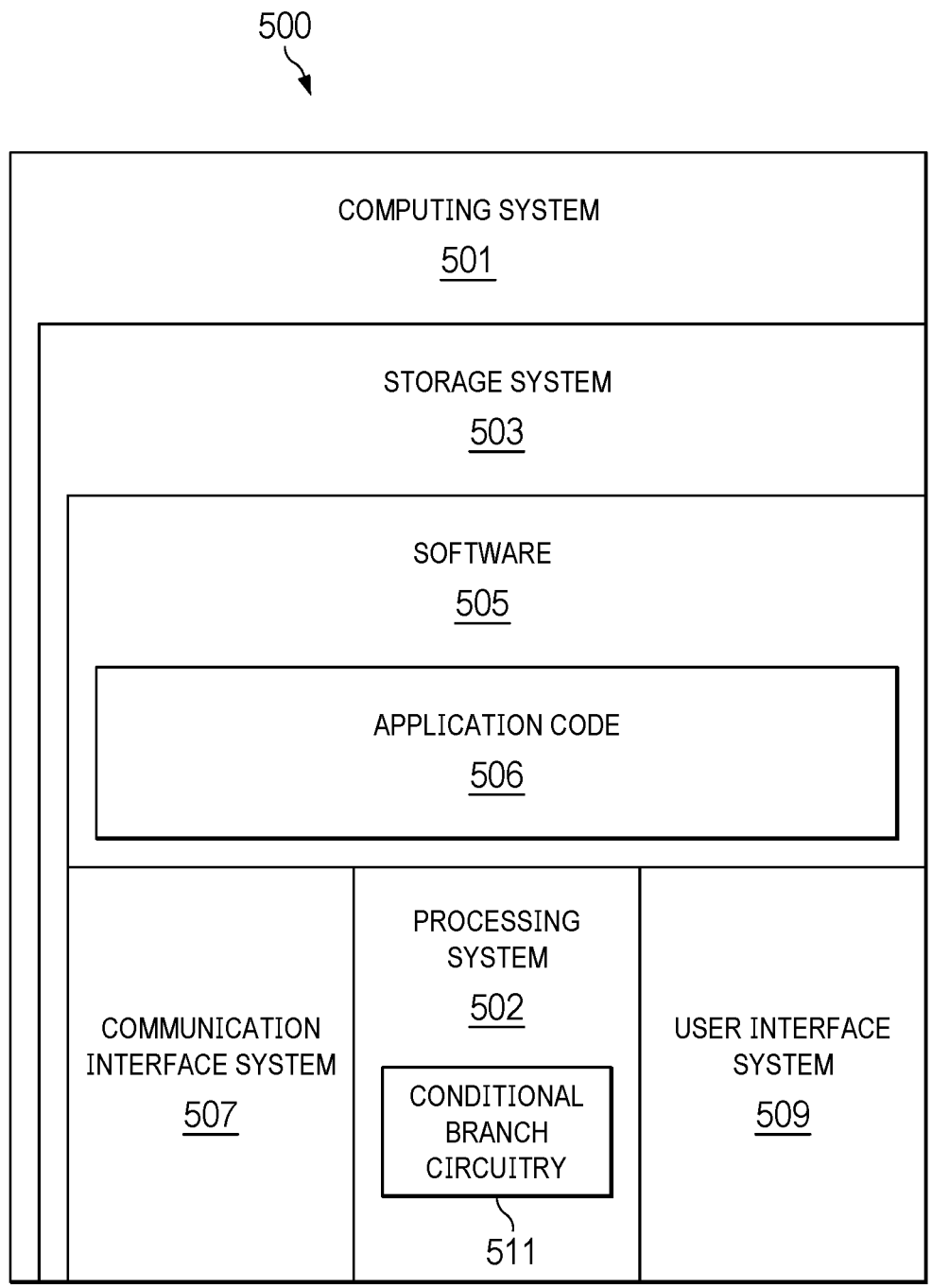
FIG. 5 illustrates an example computer system that may be used in an implementation.

FIG. 5 illustrates an example computer system that may be used in an implementation. FIG. 5 illustrates computing system 501 to generate and/or execute program instructions including conditional branch instructions according to an implementation of the present technology. Computing system 501 is representative of any system or collection of systems with which the various operational architectures, processes, scenarios, and sequences disclosed herein for loop iteration execution and conditional branching related to remainder operation execution may be employed. Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509 (optional). Processing system 502 is operatively coupled with storage system 503, communication interface system 507, and user interface system 509. Computing system 501 may be representative of a cloud computing device, distributed computing device, or the like.

Processing system 502 loads and executes software 505 from storage system 503, or alternatively, runs software 505 directly from storage system 503. Software 505 includes and implements application code 506, which is representative of

TABLE 1

Conditional branch instruction 404 syntax and semantics

| Instruction Syntax | Instruction Semantics |
| --- | --- |
| QDECB{D} A14,#count2, #u9dest0,#u9dest1,#u9dest2,#u9dest3,@ | if (A14 >= #count2) { A14 = A14 − #count2; don't branch }<br>else if (A14 == 3) { A14 = 0; branch to dest (PC + #u9dest3<<1) }<br>else if (A14 == 2) { A14 = 0; branch to dest (PC + #u9dest2<<1) }<br>else if (A14 == 1) { A14 = 0; branch to dest (PC + #u9dest1<<1) }<br>else { branch to dest (PC + #u9dest0<<1) } |
| DDECB {D} A14,#count1,#s14dest0,#s14dest1,@ | if (A14 >= #count1) {<br>  A14 = A14 − #count1;<br>  don't branch;<br>} else if (A14 == 1) {<br>    A14= 0;<br>    branch to dest (PC + #s14dest1<<1) }<br>}<br>else {<br>    branch to dest (PC + #s14dest0<<1) }<br>} |

In examples where a processing system can perform more than four iterations of instructions of a loop body in a single iteration, conditional branch instruction 404 may include additional and/or different branch destination field 408 to evaluate for each possible condition and number of remaining operations to be performed outside of the loop. For example, for a processing system capable of performing five iterations of instructions of a loop body in a single iteration, a conditional branch instruction may include five branch destinations. Four of the five branch destinations may correspond to locations storing instructions for performing a any of the program instructions, conditional branch instructions, and data related to performing software pipelining, instruction fetching, register enabling, loop iteration execution, iteration count comparison, condition evaluation, conditional branching, and other application code execution processes discussed with respect to the preceding Figures. When executed by processing system 502, software 505 directs processing system 502 to operate as described herein for at least the various processes, operational scenarios, and sequences discussed in the foregoing implementations. For example, in an implementation, software 505, when executed by processing system 502, directs processing system 502 to invoke conditional branch circuitry 511 to perform conditional branching processes as described herein. In another implementation, software 505, when executed by processing system 502, directs processing system 502 to generate program instructions including conditional branch instructions that can be used to invoke conditional branch circuitry 511 to perform conditional branching processes as described herein wherever the program instructions may reside (e.g., a server, one or more computer-readable media). Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, digital signal processing units, data processing units, application specific processors, and logic devices, as well as any other type of processing device, combinations, or variations thereof.

Storage system 503 may comprise any computer readable storage media readable and writeable by processing system 502 and capable of storing software 505. Storage system 503 may include volatile and nonvolatile, removable and non-removable, mutable and non-mutable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including application code 506) may be implemented in program instructions and among other functions may, when executed by processing system 502, direct processing system 502 to operate as described with respect to the various operational scenarios, sequences, and processes illustrated herein. For example, software 505 may include program instructions for compiling and/or implementing program instructions that include conditional branch instructions as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded environment, in a single processor or multi-processor environment, in a single host or multi-host environment, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide conditional branch instructions as described herein. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of processors, processing systems, processing and functional circuitry, circuits, sub-circuits, hardware, software, electrical components and environments thereof, the systems and methods described herein are not limited to such embodiments and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. A system, comprising:
   instruction fetch circuitry;
   decoder circuitry coupled to the instruction fetch circuitry; and
   conditional branch circuitry coupled to the decoder circuitry;
   wherein the instruction fetch circuitry is configured to:
      fetch a conditional branch instruction from a memory, wherein the conditional branch instruction specifies an iteration count and two or more branch destinations, corresponding to conditions against which the conditional branch circuitry evaluates the iteration count; and
      provide the conditional branch instruction to the decoder circuitry; and
   wherein the decoder circuitry is configured to cause the conditional branch circuitry to:
      select a branch destination, of the two or more branch destinations, based on a comparison of the iteration count to each of the conditions; and
      cause the instruction fetch circuitry to fetch an indication of an instruction from a memory location stored at the selected branch destination.

2. The system of claim 1, wherein the decoder circuitry is further configured to cause the conditional branch circuitry to perform the comparison of the iteration count to each of the conditions, wherein each condition of the conditions corresponds to a branch destination of the two or more branch destinations.

3. The system of claim 1, wherein the iteration count is based on a number of remainder operations resulting after performing a loop instruction a number of times.

4. The system of claim 3, wherein the instruction fetch circuitry is further configured to fetch the loop instruction from the memory and provide the loop instruction to the decoder circuitry.

5. The system of claim 4, wherein the decoder circuitry is further configured to cause conditional branch circuitry to perform the loop instruction the number of times and the conditional branch circuitry to decrement the iteration count each time the conditional branch circuitry performs the loop instruction.

6. The system of claim 1, wherein the conditional branch instruction further identifies a field.

7. The system of claim 1, wherein the instruction at the memory location stored at the selected branch destination corresponds to a number of remainder operations.

8. The system of claim 1, further comprising the memory.

9. One or more computer-readable storage media, comprising:
   program instructions stored thereon comprising a conditional branch instruction that specifies an iteration count and two or more branch destinations corresponding to conditions against which a processor evaluates the iteration count, wherein the program instructions, when read and executed by a processing system, direct the processor to:
  select a branch destination, of the two or more branch destinations, based on a comparison of the iteration count to each of the conditions; and
  fetch an indication of an instruction from a memory location stored at the selected branch destination.

10. The one or more computer-readable storage media of claim 9, wherein the program instructions further direct the processor to perform the comparison of the iteration count to each of the conditions, wherein each condition of the conditions corresponds to a branch destination of the two or more branch destinations.

11. The one or more computer-readable storage media of claim 9, wherein the iteration count is based on a number of remainder operations resulting after performing a loop instruction a number of times.

12. The one or more computer-readable storage media of claim 11, wherein the program instructions further comprise a loop instructions.

13. The one or more computer-readable storage media of claim 12, wherein the program instructions further direct the processor to perform the loop instruction the number of times and decrement the iteration count each time the loop instruction is performed.

14. The one or more computer-readable storage media of claim 9, wherein the conditional branch instruction further identifies a field.

15. The one or more computer-readable storage media of claim 9, wherein the instruction at the memory location stored at the selected branch destination corresponds to a number of remainder operations.

16. A method, comprising:
  receiving, instruction fetch circuitry, a conditional branch instruction from memory;
  performing a comparison of an iteration count specified by the conditional branch instruction to each of multiple conditions corresponding to two or more branch destinations specified by the conditional branch instruction;
  selecting a branch destination, of the two or more branch destinations, based on the result of the comparison; and
  causing the instruction fetch circuitry to fetch an indication of an instruction from a memory location stored at the selected branch destination.

17. The method of claim 16, wherein the iteration count is based on a number of remainder operations resulting after performing a loop instruction a number of times.

18. The method of claim 17, further comprising receiving, via the instruction fetch circuitry, the loop instruction from the memory.

19. The method of claim 18, further comprising:
  performing the loop instruction the number of times; and
  decrementing the iteration count each time the loop instruction is performed.

20. The method of claim 16, wherein the instruction at the memory location stored at the selected branch destination corresponds to a number of remainder operations.

* * * * *